(12) United States Patent
Tolle et al.

(10) Patent No.: US 8,008,872 B2
(45) Date of Patent: Aug. 30, 2011

(54) METHOD OF SHUTTING DOWN A HIGH PRESSURE DISCHARGE LAMP AND DRIVING UNIT FOR DRIVING A HIGH PRESSURE DISCHARGE LAMP

(75) Inventors: Tobias Georg Tolle, Beerse (BE); Ludo Valere Maurice Schreel, Maldegem-Donk (BE); Carsten Deppe, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 478 days.

(21) Appl. No.: 12/300,477

(22) PCT Filed: Apr. 25, 2007

(86) PCT No.: PCT/IB2007/051526
§ 371 (c)(1),
(2), (4) Date: Nov. 12, 2008

(87) PCT Pub. No.: WO2007/132369
PCT Pub. Date: Nov. 22, 2007

(65) Prior Publication Data
US 2009/0261756 A1    Oct. 22, 2009

(30) Foreign Application Priority Data
May 12, 2006  (EP) .................................... 06113840

(51) Int. Cl.
*H05B 41/36* (2006.01)
*H05B 41/24* (2006.01)
(52) U.S. Cl. ........................................ 315/307; 315/247
(58) Field of Classification Search .................. 315/224, 315/209 R, 215, 246, 247, 268.291, 293
See application file for complete search history.

(56) References Cited

U.S. PATENT DOCUMENTS

| 5,623,187 | A | * | 4/1997 | Caldeira et al. | 315/307 |
| 6,577,078 | B2 | * | 6/2003 | Shen | 315/307 |
| 6,788,009 | B2 | | 9/2004 | Fujii et al. | |
| 2002/0135324 | A1 | | 9/2002 | Fujii et al. | |
| 2005/0093474 | A1 | | 5/2005 | Nishita | |

FOREIGN PATENT DOCUMENTS

| EP | 1416518 A2 | 5/2004 |
| JP | 2004319193 A | 11/2004 |
| WO | 2005055674 A1 | 6/2005 |
| WO | 2006136993 A2 | 12/2006 |

* cited by examiner

*Primary Examiner* — Douglas W Owens
*Assistant Examiner* — Minh D A

(57) ABSTRACT

The invention describes a method of shutting down a high pressure discharge lamp (1) in which a pair of electrodes (2) is disposed in an arc tube (3), which method comprises reducing, upon receipt of a shut-down request (SR), the lamp power (P) towards a reduced power level (PR) required to sustain a long-term arc discharge between the electrodes (2), and driving the lamp (1) towards the reduced power level (PR) for a reduced power duration before completely shutting down the lamp power (P), whereby, prior to reducing the lamp power (P) towards the reduced power level (PR), the lamp power (P) is reduced to an undershoot power level (Pu), which undershoot power level (Pu) is lower than the reduced power level (PR) required to sustain a long-term arc discharge between the electrodes (2), and the lamp is driven at this undershoot power level (Pu) for an undershoot power duration (tu) before increasing the lamp power (P) again to approach the reduced power level (PR). Moreover the invention describes an appropriate driving unit (4) for driving a high pressure discharge lamp (1) and an image rendering system (40), particularly a projector system, comprising such a driving unit (4).

10 Claims, 5 Drawing Sheets

METHOD OF SHUTTING DOWN A HIGH PRESSURE DISCHARGE LAMP AND DRIVING UNIT FOR DRIVING A HIGH PRESSURE DISCHARGE LAMP

This invention relates to a method of shutting down a high pressure discharge lamp, particularly a mercury vapour discharge lamp. Furthermore, the invention relates to a driving unit for driving a high pressure discharge lamp. Moreover, the invention relates to an image rendering system, particularly a projector system, comprising a high pressure discharge lamp and such a driving unit.

High pressure discharge lamps, for example mercury vapour discharge lamps comprise an envelope which consists of material capable of withstanding high temperatures, for example, quartz glass. Electrodes made of tungsten protrude from opposite sides into this envelope. The envelope, also called "arc tube" in the following, contains a filling consisting of one or more rare gases, and, in the case of a mercury vapour discharge lamp, mainly of mercury. By applying a high ignition voltage across the electrodes, a light arc is generated between the tips of the electrodes. Once the light arc has been established, it can be maintained at a lower voltage. Owing to their optical properties, high pressure discharge lamps are a preferred choice for use in projection purposes. For such applications, a light source is required which is as point-shaped as possible. Other desired properties are a luminous intensity—as high as possible—and a spectral composition of the light—as natural as possible. These properties can be optimally achieved with so called "high pressure discharge lamps", in particular "HID lamps" (High Intensity Discharge Lamps) and "UHP-Lamps" (Ultra High Performance Lamps).

There are a number of different ways in which such a lamp can be ignited. In a conventional method, a high voltage surge of more than 20 kV is applied across the electrodes. Some newer methods work with an ignition voltage of only 5 kV and an additional "antenna" which acts to reduce the necessary voltage.

All these methods share the problem that a user, after inadvertently extinguishing such a lamp, must wait quite a while—up to several minutes—before the lamp can be turned on again. Turning on the lamp soon after turning it off is termed "hot re-strike", because the lamp is still hot when it is turned on again. Owing to the very high temperature attained by the lamp, the pressure in the arc tube is also very high. On the other hand, the higher the pressure in the arc tube after extinguishing the lamp, the greater is the ignition voltage required to start the lamp. Therefore, the lamp must cool down after being extinguished until the pressure drops to a value at which the lamp can be ignited with the usual level of ignition voltage.

In an attempt to address the problem of hot re-strike, JP 2004/319193 A describes a projector system with a lamp where, when the projector system is turned off by a user, the lamp is first brought to a lower power level and then driven at this lower power level until the lamp has cooled down to such a point that it could be re-ignited after being turned off, after a transition phase has elapsed. During the transition phase in which the lamp is operating at the lower power level, the projector system ensures that the screen is deactivated, i.e. no image is projected. The transition phase is also known as the "keep alive" phase. If, in this keep alive phase, the user turns the projector back on again, the screen can be re-activated and the lamp power can quickly be increased. Should the user turn on the projector system after the keep alive period has elapsed, the lamp—cooled down during the keep alive period and completely shut down—may be re-ignited. In both cases, from the point of view of the user, it is as though the lamp is turned on again more or less right away. The time at which the lamp can be re-ignited after being completely extinguished depends on the power at which the lamp is driven in the keep alive phase, since, at a certain power, a certain temperature equilibrium and therefore a certain pressure equilibrium arises in the arc tube. Therefore, JP 2004/319193 A suggests an approach in which the operation power is maintained at as low a level as possible in the keep alive phase. However, a lamp extinguished using this method must still be driven for a relatively long period of time at low power before being extinguished, a time in which the projector system or beamer in which the lamp is incorporated may not be moved, owing to the required power connection. Furthermore, the device is then still running, and generating a low level of noise. Evidently, it would be more desirable to have a shorter a transition time, or keep alive time. Original equipment manufacturers continue to press for as brief a keep alive time as possible for the lamps used in their products, since their aim is to satisfy customers of their equipment.

Therefore, an object of the present invention is to provide an improved method of shutting down a high pressure discharge lamp, and an appropriate device, which allows the lamp to be completely shut down after an interval of time which is shorter than the intervals made possible by the state of the art.

To this end, the present invention provides a method of shutting down a high pressure discharge lamp in which a pair of electrodes is disposed in an arc tube, which method comprises reducing, upon receipt of a shut-down request, the lamp power towards a reduced power level required to sustain a long-term arc discharge between the electrodes, and driving the lamp towards the reduced power level for a reduced power duration before completely shutting down the lamp power, whereby, prior to reducing the lamp power towards the reduced power level, the lamp power is reduced to an undershoot power level, which undershoot power level is lower than the reduced power level required to sustain a long-term arc discharge between the electrodes, and the lamp is driven at this undershoot power level for an undershoot power duration before increasing the lamp power again to approach the reduced power level.

As mentioned above, some state of the art methods of extinguishing arc discharge lamps are based on the technique of reducing the lamp power to a level at which the light-arc in the lamp can be sustained indefinitely. While driving the lamp at this reduced power level, the temperature in the lamp drops, and the pressure drops accordingly, so that, after a certain length of time has elapsed, conditions in the lamp are such that the lamp could be safely ignited again at the normal ignition voltage. This state of the art technique, while robust, takes a relatively long time. In the method according to the invention, however, the lamp power is suddenly or abruptly reduced to an undershoot power level, below the level at which a light-arc can be sustained indefinitely. The persistence of the light-arc at this low power level is made possible for a period of time by the extremely high temperature of the electrodes attained during normal operation of the lamp. The lamp is driven at this undershoot power level for a certain—relatively brief—undershoot power duration before raising the lamp power again towards the reduced power level. During the undershoot power duration, the temperature in the lamp drops rapidly, allowing a much faster drop in pressure in the lamp, so that the length of time at which the lamp needs to be driven at the reduced power level is advantageously shortened, allowing a hot re-strike after a shorter time than that offered by state of the art solutions. Furthermore, the rapid drop in temperature and the accompanying controlled drop in pressure advantageously reduces the length of time in which blackening and/or plasma etching can occur when the lamp is driven in a dimmed mode.

An appropriate driving unit for driving a high pressure discharge lamp should comprise a shut down request input for receiving a shut down request, and a lamp power control unit. The lamp power control unit is configured in such a way that, upon receiving the shut down request, the lamp power is reduced towards a reduced power level required to sustain a long-term arc discharge between the electrodes. Thereby, according to the invention, the lamp power control unit is configured in such a way that, prior to reducing the lamp power towards the reduced power level, the lamp power is reduced to an undershoot power level, which undershoot power level is lower than the reduced power level required to sustain a long-term arc discharge between the electrodes, and the lamp is driven at this undershoot power level for an undershoot power duration before increasing the lamp power again to approach the reduced power level and, the lamp is driven at the reduced power level for a reduced power duration before completely shutting down the lamp power.

The dependent claims and the subsequent description disclose particularly advantageous embodiments and features of the invention.

The values of a reduced power level, undershoot power level, reduced power duration or the undershoot power duration can be determined during operation of the lamp, for example by monitoring one or more operating parameters of the lamp such as the lamp voltage, lamp current, the pressure and/or temperature in the lamp, etc. The measured values can be used to decide, for example, when to decrease or increase the lamp power to satisfy a stability criterion. A stability criterion may be, for example, the maintenance of a steady voltage across the electrodes, or at least a voltage with a low level of fluctuation.

Conditions in a high-pressure lamp are not always stable, and an unwanted or unexpected drop in pressure can result in a premature collapse of the arc discharge, so that the lamp is extinguished too soon, i.e. before the temperature and/or pressure in the lamp have attained levels at which the lamp could be ignited again, or at which the mercury in the fill gas will not be deposited on the walls of the arc tube. In a preferred method according to the invention therefore, to ensure that such an inadvertent collapse of the discharge arc is avoided, at least one operating parameter of the lamp is monitored with regard to fulfillment of a stability criterion during driving of the lamp at the undershoot power level, and the lamp power is increased above the reduced power level to interrupt the undershoot power duration if the stability criterion is not fulfilled. It might suffice to simply raise the lamp power briefly before dropping it again to the undershoot power level, or it might be necessary to maintain the lamp power above the reduced power level for the remainder of the shut-down procedure.

There are a number of ways in which a suitable stability criterion can be determined or defined. In one example, a lamp voltage mean value can be continually measured over a certain time window, or a number of consecutive measurements (samples) of the lamp voltage are determined, and with the aid of the mean value, it can be determined whether individual voltage measurements fluctuate or deviate too far from the mean. In such a case, a correction can be made, for example by increasing the lamp current to raise the lamp power and therefore also the temperature and lamp pressure. Usually, a momentary power regulation is performed in the lamp driver by regulating the current, i.e. a reduction or increase of the momentary power is obtained by reducing or increasing the current.

To obtain the necessary measurements, a driving unit according to the invention preferably comprises a monitoring arrangement for monitoring one or more operating parameters such as lamp voltage during the shut-down process, i.e. after receipt of a shut-down request, with regard to fulfillment of a stability criterion such as a specific behaviour of the lamp voltage.

Evidently, monitoring a stability criterion is not limited to the undershoot phase, but can also be carried out when the lamp is being driven at or towards the reduced power phase, where the light arc is sustained at a lowest power level. In this keep alive phase, it is crucial that the light-arc is sustained. Therefore, lamp parameters such as voltage and current may be continually monitored with regard to a stability criterion, and are adjusted accordingly in order to be able to drive the lamp at the reduced power level for the required length of time.

However, equipping a lamp driving unit to include the means to carry out such measurements can be costly. Alternatively, advantage can be made of the fact that essentially all lamps of the same make will exhibit essentially the same behaviour under the same operating conditions. Therefore, in a particularly preferred embodiment of the invention, the values are pre-determined for a certain lamp type, for example in a calibration procedure. It is then sufficient to configure the lamp driver accordingly, in order for the lamp power to be increased or decreased, as necessary, at the appropriate times.

For example, particularly for a lamp with 120 W rated or nominal power, the undershoot power level can preferably lie between 3% and 20% of rated power. In a preferred embodiment of the invention, the undershoot power level lies between 5% and 15% of rated power, and, in a particularly preferred embodiment of the invention, the undershoot power level lies between 7.5% and 12.5% of the rated power.

The length of time at which the lamp is driven at the undershoot power level can also be predetermined for a certain lamp type. For example, for a 120 W lamp, the undershoot power duration can be between 5 s and 45 s, preferably between 10 s and 30 s.

Of course, it is possible to combine both approaches, and to have a lamp driver according to the invention which is capable of driving a lamp at predefined levels for predefined durations, while also monitoring one or more operating parameters in the event that adjustments do actually need to be made to the predefined levels or predefined durations in order to avoid a premature extinguishing of the lamp.

When the shut-down request is received, the lamp power can be dropped very abruptly, with a steep drop, to the undershoot power level, so that this power level is attained in a very brief time. Alternatively, the power can be dropped less abruptly, but nonetheless quickly, for example by dropping the power in a series of relatively large steps towards the undershoot power level. However, since a rapid drop in temperature is desired, the lamp power is preferably dropped to the undershoot power level as quickly as possible. Once the undershoot duration has elapsed, the lamp power can be raised to the reduced power level, and the lamp can be driven at the reduced power level for the remainder of the keep alive duration. Alternatively, the lamp power can first be raised to a level considerably higher than the reduced power level, and then decreased to approach the reduced power level. Reducing the lamp power towards the reduced power level can be done in a number of ways. For example, the power can be reduced relatively slowly, continuously or step-wise, until the reduced power level is reached, the level at which the stability of the arc discharge is maintained. The rate of change of adjustment of lamp power can be chosen according to the momentary lamp power. In other words, in the case of a relatively low momentary power, the power will only be reduced further at a slow rate, whereas for a higher momentary power, the changes take effect faster. In this way, the system "feels" its way towards the reduced power level, so as to avoid an inadvertent premature extinguishing of the lamp.

Evidently, external cooling of the lamp can also be carried out in order to ensure a short keep alive time. A forced cooling of the lamp can be initiated or increased during one or more stages of the shutting down process. For example, a cooling means, e.g. a ventilator or ventilator array, can be arranged in some way about the lamp, and this cooling means can be activated, or the level of cooling can be increased, as soon as the shut-down request been sent to the lamp driver.

There are various ways of determining when the lamp is sufficiently cooled down to a state in which it can safely be extinguished. For example, the lamp can be turned off after reaching the low equilibrium temperature, which can be assumed to have been reached when there is no noticeably significant change in voltage across the electrodes. In another, particularly simple approach, the lamp is just shut down after being driven at low power levels—undershoot and reduced power levels—for a certain, predefined, time period. This time period can be determined for a certain lamp type, for example, in a prior calibration step. In another approach, the pressure and/or the voltage and/or the current in the lamp are monitored during driving of the lamp at the reduced operation level and the lamp is shut down according to the observed pressure.

An image rendering system according to the invention, in particular a projection system, must, according to the invention, comprise, besides a high pressure discharge lamp, a driving unit pursuant to the invention for the lamp. Such an image rendering system might also comprise a central control unit for sending a shut down request to the driving unit.

Use of such a higher-ranking control unit has the advantage that a typical lamp driver need only be slightly modified, for example by corresponding software updates in a programmable control chip of the lamp driver which controls the power. Complicated hardware modifications to the lamp driver would not be necessary.

Most image rendering or projector systems have, in any case, a central control unit which controls and synchronizes the further components of the projector system, such as, for example, a colour wheel or a display. In a preferred embodiment, the image rendering system also comprises an image termination unit. The central control can be used to issue, at the same time as the shut down request for the lamp driver, an appropriate command to the image termination unit to cause the image rendering procedure to be terminated, resulting in a darkening of the display, i.e. further image rendering is suspended as long as the lamp is in the transition phase between receiving the shut down request and being completely extinguished.

Besides the darkening of the display, the actual lamp shut-down process will effectively go unnoticed by the user, who will only be aware of the fact that the projector can be turned on again immediately after an inadvertent turning off, since the lamp is either still in the keep alive or transition state and can therefore be brought back to a normal operating power level, or if the lamp has indeed been extinguished completely, it will have cooled down sufficiently due to the method according to the invention, so that it can be re-ignited immediately.

Generally the invention might be used for all types of high pressure discharge lamps. Preferably it is used for HID lamps and particularly UHP lamps. The invention can also be applied to other lamps which are not intended for use in projection systems, for example, lamps for automotive lightning systems.

Other objects and features of the present invention will become apparent from the following detailed descriptions considered in conjunction with the accompanying drawings. It is to be understood, however, that the drawings are designed solely for the purposes of illustration and not as a definition of the limits of the invention. In the drawings, wherein like reference characters denote the same elements throughout:

The dimensions of the objects in the figures have been chosen for the sake of clarity and do not necessarily reflect the actual relative dimensions.

Figure 1:
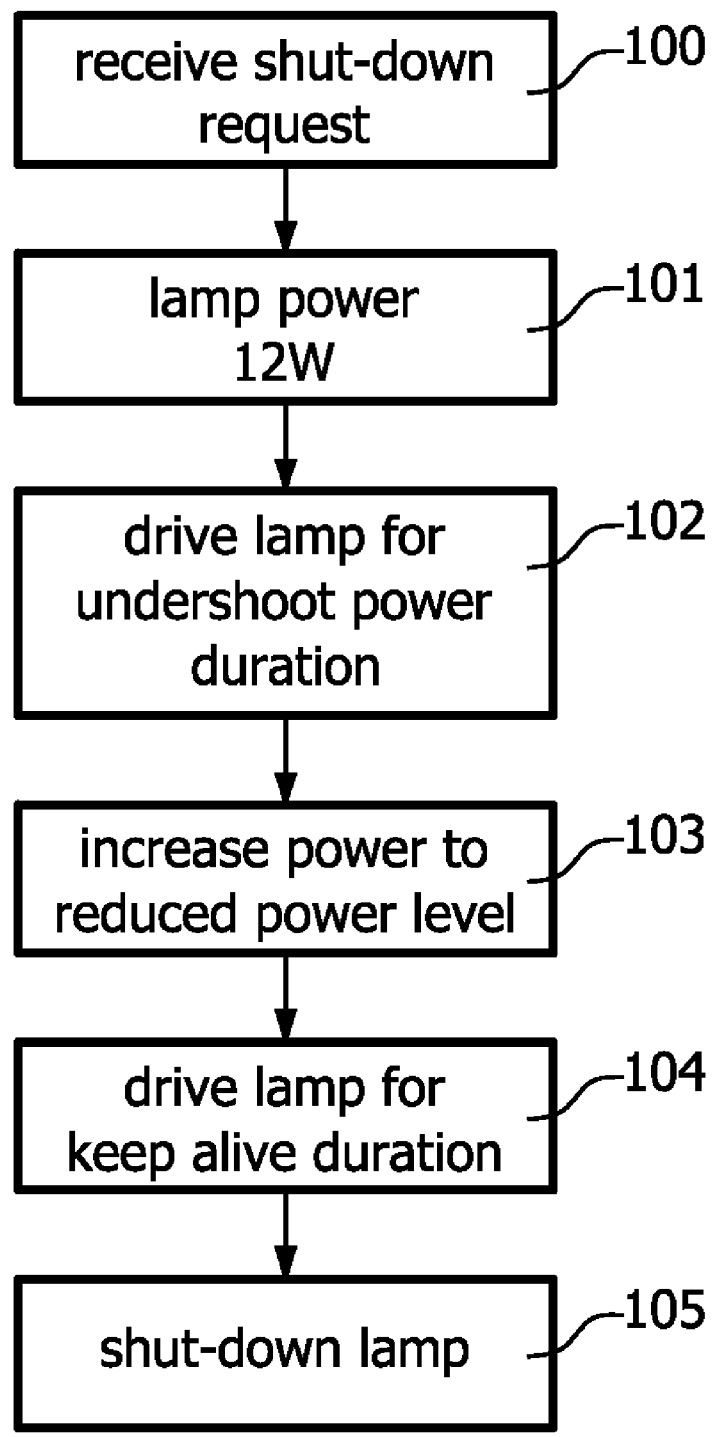
FIG. 1 shows a flow chart of a sequence of actions of the method pursuant to the invention according to a first embodiment.
Figure 2:
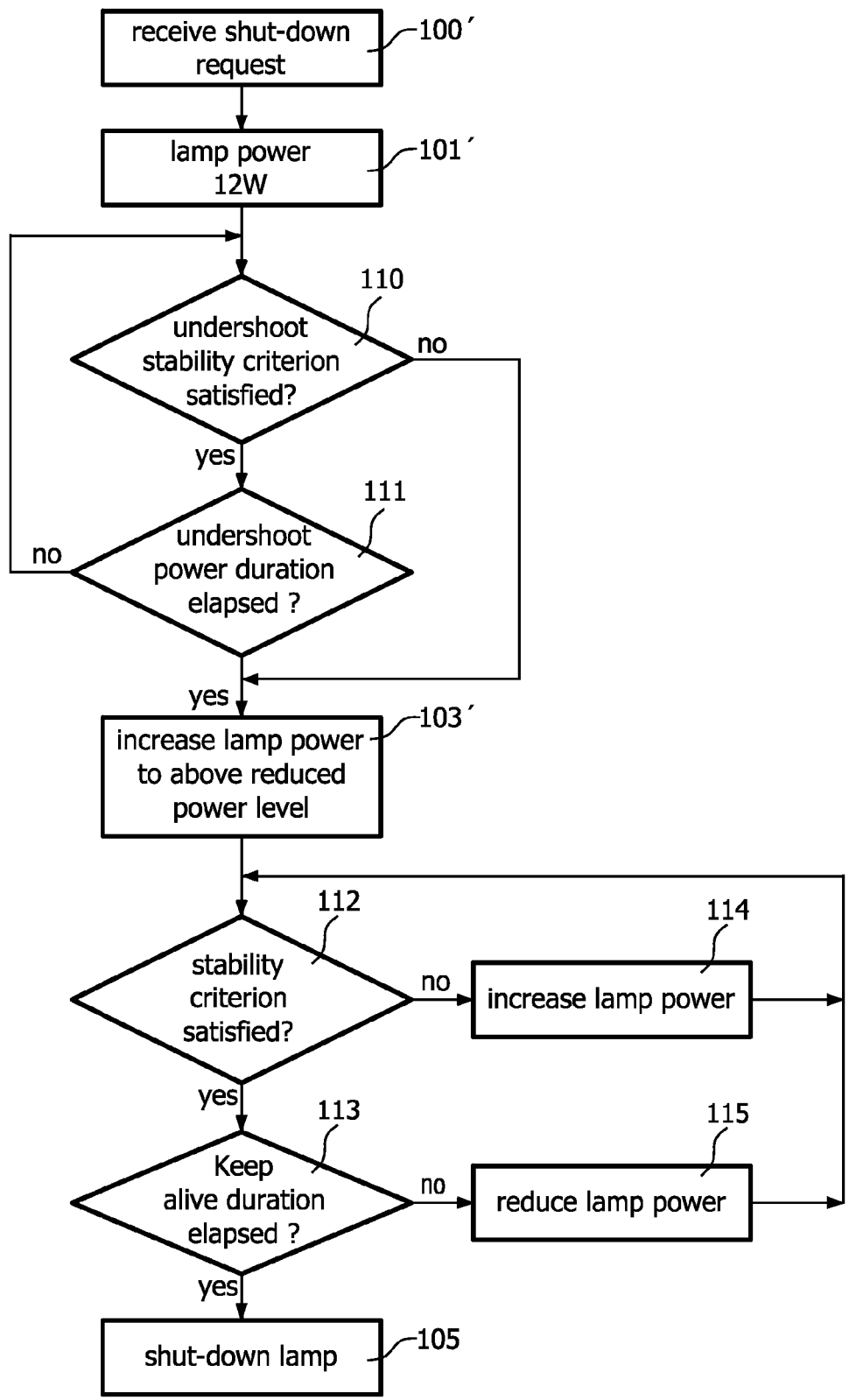
FIG. 2 shows a flow chart of a sequence of actions of the method pursuant to the invention according to a second embodiment.

In FIGS. 1-2, possible sequences of actions for turning off a mercury vapour discharge lamp are described. It goes without saying that the values mentioned in connection with these definite courses of action are purely exemplary and relate—without restricting the generality of the invention—to a mercury vapour discharge lamp with 120 Watt nominal power in normal operation of the lamp. Evidently, these values must be adjusted to suit any lamps or driver constructions actually used.

FIG. 1 shows the steps in a simple shut-down sequence. In step 100, a shut-down request is received. On receipt of this shut-down request, the lamp power is reduced abruptly in step 101 to an undershoot power level of 10% of nominal power, in this case to a level of 12 W. In step 102, the lamp is driven at this undershoot power level for an undershoot power duration of 25 s. Once this undershoot power duration has elapsed, the lamp power is raised again in step 103 to a value somewhat greater than or equal to a reduced power level, in this case 25 W, and the lamp is driven towards or at the reduced lamp power level in step 104 for a predefined keep alive time, for example, for 30 s. Once the keep alive duration has elapsed, the lamp is ultimately extinguished in step 105.

Since conditions in the lamp are often affected by external influences, it can be beneficial to monitor these conditions and to drive the lamp accordingly, particularly in the shut-down process, where, as already described in detail, fluctuations in conditions in the lamp can lead to an undesirable premature extinguishing of the arc discharge. In FIG. 2, the shut-down process is monitored to control the extinguishing of the lamp. Again, in step 100, a shut-down request is received, and in step 101, the lamp power is abruptly dropped to a undershoot power value of 10% of nominal power, in this case to a level of 12 W. Subsequently, appropriate parameters are monitored, and, in step 110, checked to see if an undershoot stability criterion is satisfied. If this is the case, the lamp is driven at this undershoot power level, and the elapsed time is monitored in step 111. Once a predefined undershoot power duration has elapsed, in this case 25 s, the lamp power is raised above a reduced power level in step 103'. This also occurs if, in step 110, the undershoot stability criterion was not satisfied. In such as case, the lamp power is raised so as to avoid a premature extinguishing of the lamp owing to a too severe drop in lamp pressure.

The level to which the lamp power is raised in step 103' is greater than or equal to the reduced power level of 25 W, which is the level for this lamp at which the light arc can be sustained indefinitely. The lamp power will now be reduced gradually in a regulation loop to the target reduced power level of 25 W. In step 112, a stability criterion is monitored. If conditions in the lamp are not stable enough to satisfy the stability criterion, the lamp power is raised slightly in step 114 and process control returns to step 112. If conditions in the lamp are stable, a check is carried out on the elapsed time in step 113. If a predefined keep alive time, e.g. 40 s, has not yet elapsed, the lamp power is reduced in step 115 and process control returns to step 112. If the keep alive time has elapsed, the lamp is ultimately shut down in step 105. Naturally, the lamp could also be shut down in step 105 if monitored conditions in the lamp indicate that the lamp has reached an equilibrium stage where shut-down is safe, even if the predefined keep alive time has not yet elapsed.

Figure 3A:
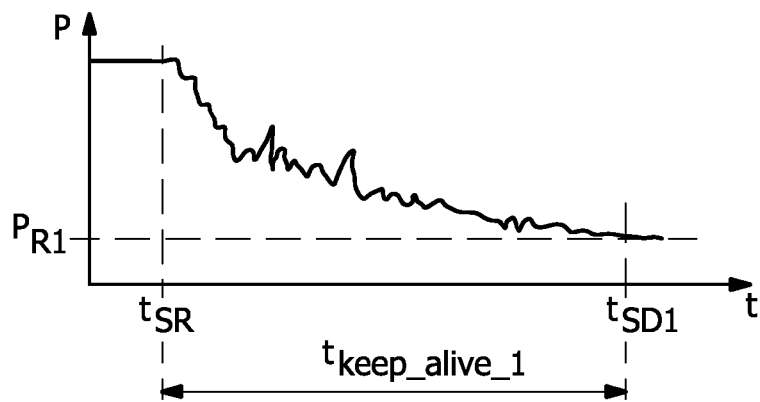
FIG. 3a shows a graph of lamp power in a shut-down process using a method according to state of the art.
Figure 3B:
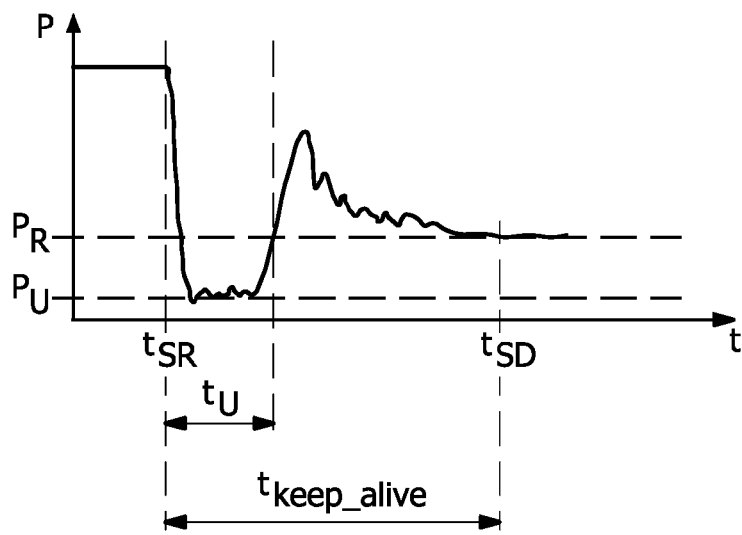
FIG. 3b shows a graph of lamp power in a shut-down process using a method according to the invention.
Figure 3C:
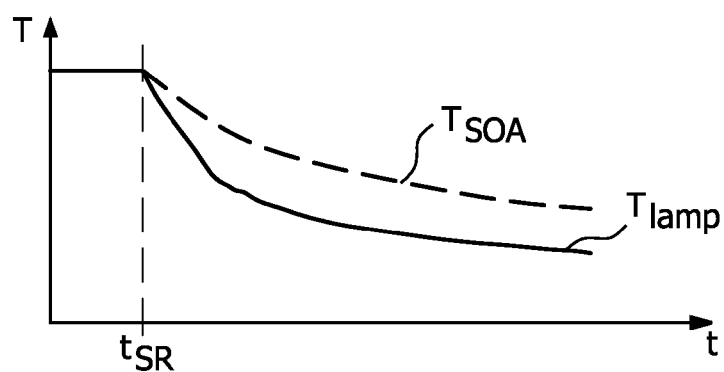
FIG. 3c shows a graph of lamp temperatures in shut-down process according to state of the art and the method according to the invention.

The graphs in FIGS. 3a-3c show changes in lamp power and lamp temperature in a lamp being shut down. The graph in FIG. 3a shows the lamp power in a lamp being shut down using a state-of-the-art method. Here, a shut-down request is received at time $t_{SR}$, and the lamp power P is thereafter reduced gradually towards a reduced lamp power level $P_{R1}$, until a state of equilibrium has been reached in the lamp at this reduced power level, at which time $t_{SD}$ the lamp can be extinguished completely. The time elapsed between first lowering the lamp power and attainment of the equilibrium state is the transition time or keep alive period $t_{keep\_alive\_1}$.

The behaviour of lamp power in a lamp being shut down using the method according to the invention is shown in FIG. 3b. Again, a shut-down request is received at time $t_{SR}$. The lamp power is then abruptly reduced to an undershoot power level $P_U$. As can be seen in the graph, the slope of the lamp power is very steep and negative, showing the abrupt drop in lamp power. The lamp is driven at the extremely low undershoot power $P_U$ for an undershoot power duration $t_U$. Then, the lamp power is raised again and adjusted to approach a reduced power level $P_R$. Since the lamp has cooled rapidly during the undershoot phase, a state of equilibrium at the reduced power level $P_R$ is reached sooner, so that the lamp can finally be extinguished at time $t_{SD}$. Clearly, the transition or keep alive period $t_{keep\_alive}$ is shorter in the method according to the invention.

A comparison of the behaviour in lamp temperature for both methods is shown in FIG. 3c. The temperature T in the lamp starts to drop after the power in the lamp is reduced at time $t_{SR}$, when the shut-down request is received. Using the method according to the invention, a rapid drop in temperature in the lamp can be obtained during the undershoot power phase, as shown by the curve drawn using a solid line, $T_{lamp}$. Using a state of the art method, the lamp temperature drops much more slowly, as shown by the dashed line $T_{SOA}$. The rapid drop in temperature in the lamp using the method according to the invention enables the lamp to reach a state of equilibrium at a reduced power level in a shorter length of time, so that the lamp can be extinguished much sooner.

Figure 4:
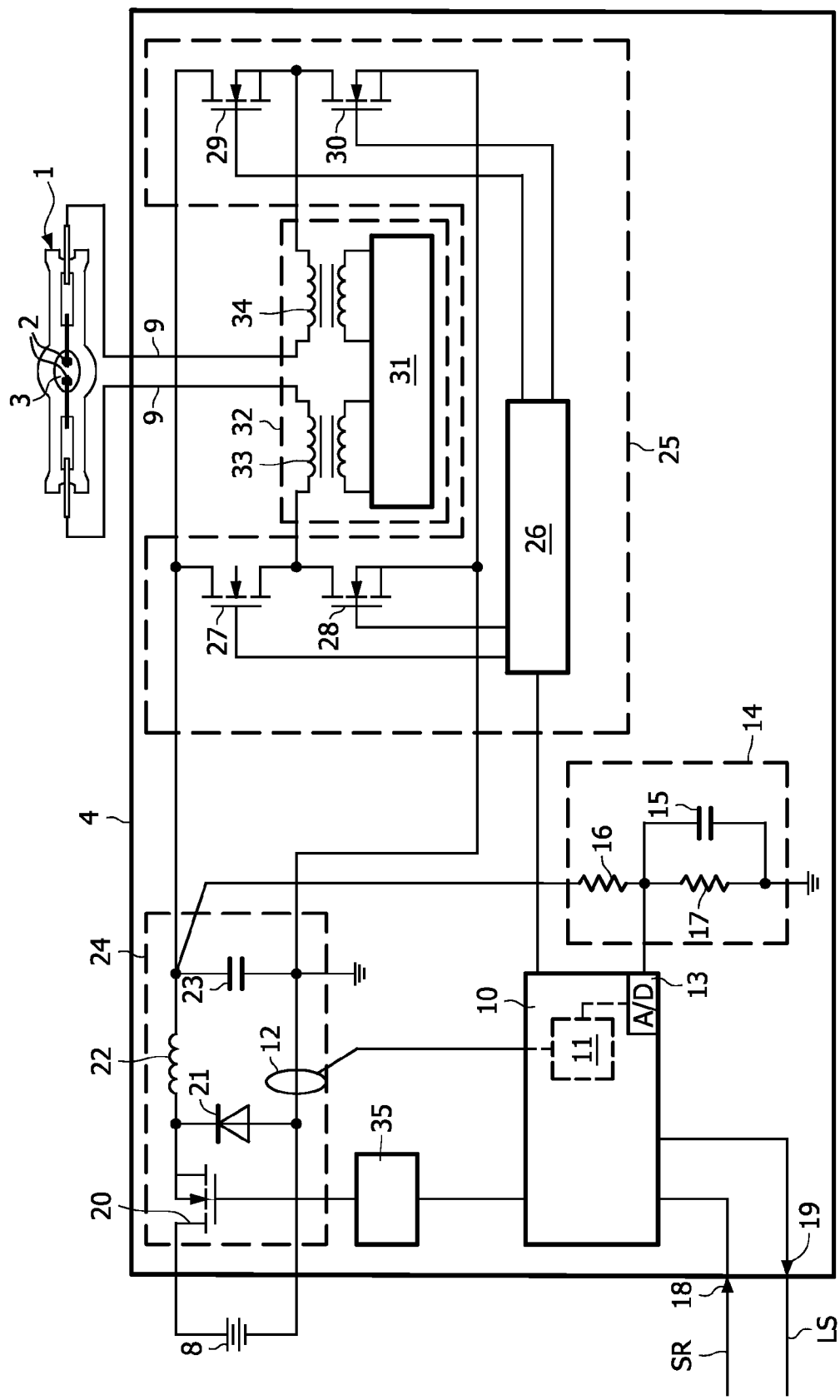
FIG. 4 shows a block diagram of a lamp driving unit according to the invention.

FIG. 4 shows a possible realisation of a driving unit 4 according to the invention for driving a gas discharge lamp.

This driving unit 4 is connected via connectors 9 with the electrodes 2 in the discharge chamber 3 of the gas discharge lamp 1. Furthermore, the driving unit 4 is connected to a power supply 8, and features an input 18 to receive a shut down request SR or other control signals, and also an output 19, for reporting, for example, the lamp status LS to a higher-level control unit. The driving unit 4 comprises a direct current converter 24, a commutation stage 25, an ignition arrangement 32, a lamp power control unit 10, a voltage measuring unit 14, and a current measuring unit 12.

The lamp power control unit 10 controls the converter 24, the commutation stage 25, and the ignition arrangement 32, and monitors the voltage behaviour of the lamp driver 4 at the gas discharge lamp 1.

The commutation stage 25 comprises a driver 26 which controls four switches 27, 28, 29, 30. The ignition arrangement 32 comprises an ignition controller 31 (comprising, for example, a capacitor, a resistor and a spark gap) and an ignition transformer which generates, with the aid of two chokes 33, 34, a symmetrical high voltage so that the lamp 1 can ignite.

The converter 24 is fed by the external direct current power supply 8 of, for example, 380V. The direct current converter 24 comprises a switch 20, a diode 21, an inductance 22 and a capacitor 23. The lamp power control unit 10 controls the switch 20 via a level converter 35, and thus also the current in the lamp 1. In this way, the actual lamp power is regulated by the lamp power control unit 10.

The voltage measuring unit 14 is connected in parallel to the capacitor 23, and is realised in the form of a voltage divider with two resistors 16, 17. A capacitor 15 is connected in parallel to the resistor 17.

For voltage measurement, a reduced voltage is diverted at the capacitor 23 via the voltage divider 16, 17, and measured in the lamp power control unit 10 by means of an analogue/digital converter 13. The capacitor 15 serves to reduce high-frequency distortion in the measurement signal.

The current in the lamp 1 is monitored in the lamp power control unit 10 by means of the current measuring unit 12, which operates on the principle of induction. Since the lamp power control unit 10 controls the current in the lamp 1 by means of the level converter 35 and the switch 20, the momentary current level can also be taken over in the lamp power control unit 10. In this case, the current measuring unit required according to the invention is directly integrated in the control circuit, and the external current measuring unit 12 shown in FIG. 4 can, for example, be used for monitoring purposes, or, for some types of lamps, be dispensed with entirely.

The lamp power control unit 10 comprises a programmable microprocessor. An analysing unit 11 is implemented here in the form of software running on the microprocessor of the control circuit. The analysing unit 11 records and analyses the measurement values reported by the voltage measuring unit 14 and the current measuring unit 12.

Together with the voltage measuring unit 14 and the analogue/digital converter 13, the analysing unit 11 offers a monitoring arrangement for monitoring the lamp voltage during the lamp power reduction process, and during driving of the lamp at the reduced operation level. The analysis or assessment within the analysing unit 11 can be carried out with regard to the defined discharge process stability criterion according to the invention, so that the lamp power control unit 10 can regulate the process described by FIGS. 1 and 2.

Lamp pressure can also be monitored in the analysing unit 11, since the voltage is monitored here, and the current can also be measured with the aid of the current measuring unit 12. Therefore, using the analysing unit 11, the cooling criterion can also be assessed, and the shut down process can be ended by finally turning off the lamp 1.

The command to initiate the shut down process of the lamp is forwarded to the lamp control unit 10 directly via the input 18 in the form of a shut down request SR. The momentary lamp status LS of the lamp 1 can be made known by the lamp power control unit 10 via the output 19.

In particular, the lamp status can report whether the lamp 1 is still being driven at the undershoot power level, or towards the reduced power level in the transition period, or whether the shut down process is complete. If necessary, more precise information, e.g. data pertaining to the momentary pressure as determined by the analysing unit 11, can be made known via this output 19.

Figure 5:
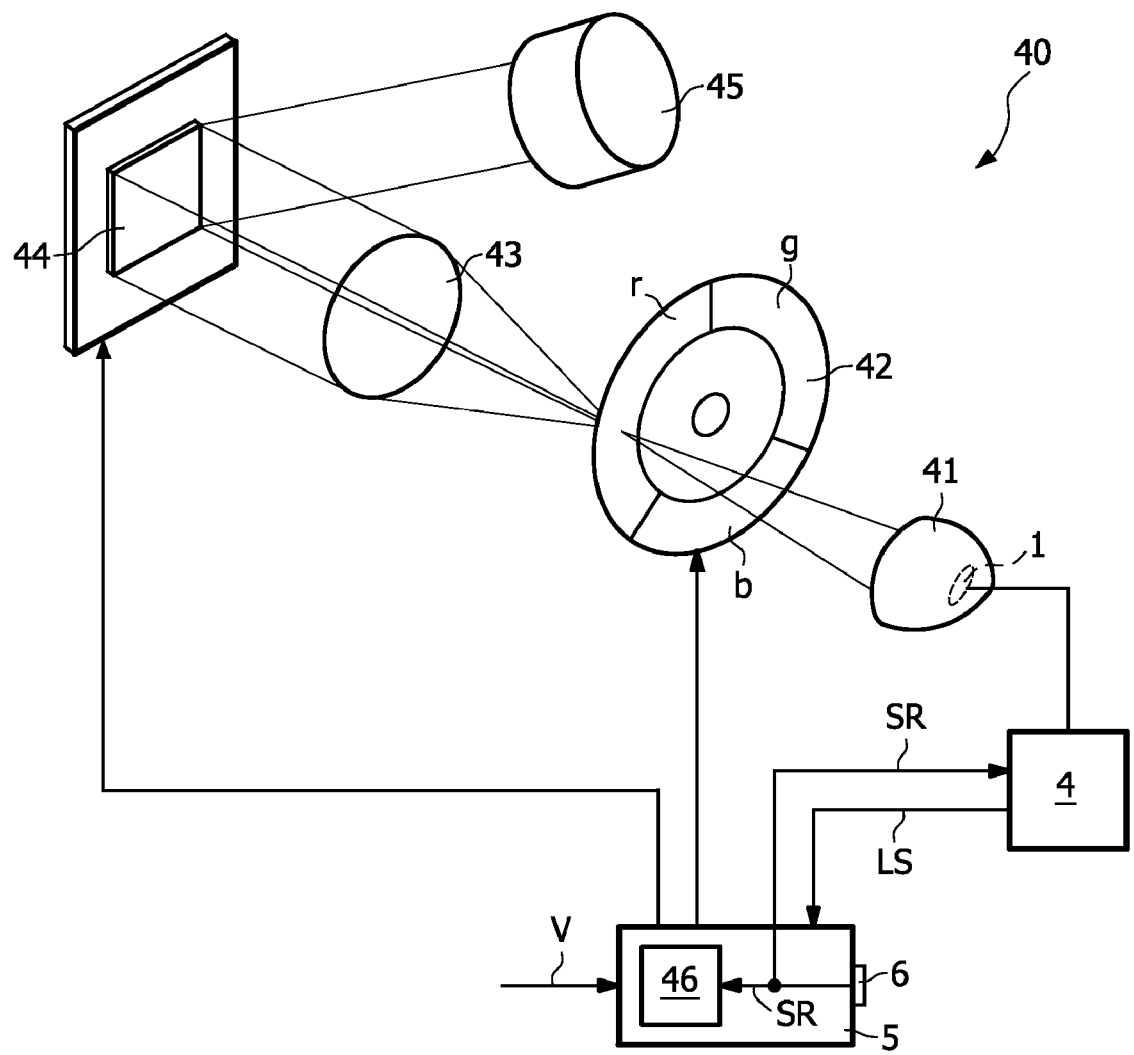
FIG. 5 shows a schematic representation of an embodiment of a projector system according to the invention.

FIG. 5 shows a projector system 40 according to the invention. Here, the projector system 40 is a sequential system, in which the different colours—red, green and blue—are rendered one after the other, whereby distinct colours are perceived by the user owing to the reaction time of the eye.

Thereby, the light of the lamp 1 is focussed within a reflector 41 onto a colour wheel 42 with three colour regions red r, green g, and blue b. This colour wheel 42 is driven at a certain pace, so that either a red image, a green image, or a blue image is generated. The red, green, or blue light generated according to the position of the colour wheel 42 is then focussed by a collimating lens 43, so that a display unit 44 is evenly illuminated. Here, the display unit 44 is a chip upon which is arranged a number of miniscule moveable mirrors as individual display elements, each of which is associated with an image pixel. The mirrors are illuminated by the light. Each mirror is tilted according to whether the image pixel on the projection area, i.e. the resulting image, is to be bright or dark, so that the light is reflected through a projector lens 45 to the projection area, not shown in the diagram, or away from the projector lens 45 and into an absorber. The individual mirrors of the mirror array form a grid with which any image can be generated and with which, for example, video images can be rendered. Rendering of the different brightness levels in the image is effected with the aid of a pulse-width modulation method, in which each display element of the display apparatus is controlled such that light impinges on the corresponding pixel area of the projection area for a certain part of the image duration, and does not impinge on the projection area for the remaining time. An example of such a projector system is the DLP®-System (DLP=Digital Light Processing) of Texas Instruments®. Naturally, the invention is not limited to that kind of projector system, but can be used with any other kind of projector system.

FIG. 5 also shows that the lamp 1 is controlled by a lamp driving unit 4, which is in turn controlled by a central control unit 5. Here, the central control unit 5 also manages the synchronisation of the colour wheel 42 and the display apparatus 44. A signal such as a video signal V can be input to the central control unit 5 as shown in this diagram. Such a video signal can originate from any appropriate source, not shown in the diagram, such as a satellite receiver, video cassette recorder (VCR), digital video disc (DVD), personal computer (PC), etc.

The central control unit 5 is also connected to a power supply, not shown in the diagram, and is provided with a user interface 6, for example an on/off switch or remote control input or similar, with which the user can turn off the projector system 40. The control unit subsequently sends a shut down request SR to the input of the lamp driver 4, so that this can reduce the lamp power in the prescribed way, and then turn off the lamp 1 after it has cooled down sufficiently. Furthermore, the central control unit 5 can, via an image termination unit 46 which also receives the shut-down request SR, control the display unit 44 so that an image is no longer rendered. From the point of view of the user, the device is to all intents and purposes turned off, and light is no longer projected on to the projection area.

As soon as the lamp driving unit 4 has completely turned off the lamp 1, it reports a corresponding lamp status signal LS via the output 19 to the central control unit 5, which then turns off lamp driving unit 4, and, for example, places the entire apparatus in a stand-by state, or shuts down completely.

Although the present invention has been disclosed in the form of preferred embodiments and variations thereon, it will be understood that numerous additional modifications and variations could be made thereto without departing from the scope of the invention. For the sake of clarity, it is also to be understood that the use of "a" or "an" throughout this application does not exclude a plurality, and "comprising" does not exclude other steps or elements. Also, a "unit" may comprise a number of blocks or devices, unless explicitly described as a single entity.

The invention claimed is:

1. A method of shutting down a high pressure discharge lamp (1) in which a pair of electrodes (2) is disposed in an arc tube (3), which method comprises reducing, upon receipt of a shut-down request (SR), the lamp power (P) towards a reduced power level (PR) required to sustain a long-term arc discharge between the electrodes (2), and driving the lamp (1) towards the reduced power level (PR) for a reduced power duration before completely shutting down the lamp power (P), whereby,
   prior to reducing the lamp power (P) towards the reduced power level (PR), the lamp power (P) is reduced to an undershoot power level (PU), which undershoot power level (PU) is lower than the reduced power level (PR) required to sustain a long-term arc discharge between the electrodes (2), and the lamp is driven at this undershoot power level (PU) for an undershoot power duration (tU) before increasing the lamp power (P) again to approach the reduced power level (PR).

2. The method according to claim 1, wherein the values of a reduced power level (PR) and/or the undershoot power level (PU) and/or the reduced power duration and/or the undershoot power duration (tU) are pre-determined for a certain lamp type.

3. The method according to claim 1, wherein at least one operating parameter of the lamp (1) is monitored with regard to fulfilment of a stability criterion during driving of the lamp (1) at the undershoot power level (PU), and the lamp power (P) is increased above the reduced power level (PR) to interrupt the undershoot power duration (tU) if the stability criterion is not fulfilled.

4. The method according to claim 1, wherein at least one operating parameter of the lamp (1) is monitored during driving of the lamp (1) at the reduced power level (PR), and the lamp (1) is shut down according to the observed operating parameter.

5. The method according to claim 1, wherein the undershoot power level (PU) lies between 3% and 20%, preferably between 5% and 10%, and more preferably between 7.5% and 12.5% of the rated power for a certain lamp type.

6. The method according to claim 1, wherein the lamp is driven at the undershoot power level (PU) for a period of time between 5s and 45s, preferably between 10s and 30s.

7. A driving unit (4) for driving a high pressure discharge lamp (1) in which a pair of electrodes (2) is disposed in an arc tube (3), which driving unit (4) comprises
a shut down request input (18) for receiving a shut down request (SR),
and a lamp power control unit (10), which is configured in such a way that upon receiving the shut down request (SR), the lamp power (P) is reduced towards a reduced power level (PR) required to sustain a long-term arc discharge between the electrodes (2), and the lamp (1) is driven towards the reduced power level (PR) for a reduced power duration before completely shutting down the lamp power (P), and whereby, prior to reducing the lamp power (P) towards the reduced power level (PR), the lamp power (P) is reduced to an undershoot power level (PU), which undershoot power level (PU) is lower than the reduced power level (PR) required to sustain a long-term arc discharge between the electrodes (2), and the lamp is driven at this undershoot power level (PU) for an undershoot power duration (tU) before increasing the lamp power (P) again to approach the reduced power level (PR).

8. A driving unit (4) according to claim 7, comprising a monitoring arrangement (11, 12, 13, 14) for monitoring at least one operating parameter during the shut-down process with regard to fulfilment of a stability criterion.

9. An image rendering system (40), particularly a projector system, comprising a high pressure discharge lamp (1) in which a pair of electrodes (2) is disposed in an arc tube (3), and a driving unit (4) according to claim 7.

10. An image rendering system according to claim 9, comprising an image termination unit (46) for terminating an image rendering procedure upon receipt of a shut down request (SR).

* * * * *